US008928787B2

(12) United States Patent
Takane (10) Patent No.: US 8,928,787 B2
(45) Date of Patent: Jan. 6, 2015

(54) PHOTOGRAPHING APPARATUS AND PHOTOGRAPHING METHOD

(75) Inventor: Yasuo Takane, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 231 days.

(21) Appl. No.: 12/975,751

(22) Filed: Dec. 22, 2010

(65) Prior Publication Data

US 2011/0149130 A1 Jun. 23, 2011

(30) Foreign Application Priority Data

Dec. 22, 2009 (JP) ................................. 2009-290777
Nov. 29, 2010 (KR) ........................ 10-2010-0119790

(51) Int. Cl.
| | |
|---|---|
| H04N 3/14 | (2006.01) |
| H04N 5/335 | (2011.01) |
| H04N 5/235 | (2006.01) |
| G03B 7/00 | (2014.01) |
| H04N 5/228 | (2006.01) |
| H04N 5/232 | (2006.01) |
| H04N 5/353 | (2011.01) |
| H04N 5/359 | (2011.01) |

(52) U.S. Cl.
CPC ........... *H04N 5/335* (2013.01); *H04N 5/23248* (2013.01); *H04N 5/3532* (2013.01); *H04N 5/3597* (2013.01)
USPC ........................ 348/296; 348/208.12; 348/362

(58) Field of Classification Search
None
See application file for complete search history.

(56) References Cited

U.S. PATENT DOCUMENTS

| | | | |
|---|---|---|---|
| 2003/0118153 A1 | 6/2003 | Suzuki | |
| 2006/0146160 A1* | 7/2006 | Murakami et al. | 348/308 |
| 2007/0019937 A1* | 1/2007 | Endo | 396/52 |
| 2007/0126901 A1* | 6/2007 | Kuroda | 348/296 |
| 2007/0253694 A1* | 11/2007 | Miyazawa et al. | 396/234 |
| 2008/0049133 A1* | 2/2008 | Bock | 348/317 |
| 2008/0253758 A1* | 10/2008 | Yap et al. | 396/234 |
| 2008/0284873 A1* | 11/2008 | Miyanari | 348/229.1 |
| 2009/0015704 A1* | 1/2009 | Namai et al. | 348/340 |

FOREIGN PATENT DOCUMENTS

| | | | |
|---|---|---|---|
| JP | 60-047572 A | | 3/1985 |
| JP | 11-041523 A | | 2/1999 |
| JP | 11-261896 A | | 9/1999 |
| JP | 11261896 A | * | 9/1999 |

(Continued)

OTHER PUBLICATIONS

JP-11261896-A Translation—Maching translation of corresponding JP document.*

(Continued)

*Primary Examiner* — Jason Flohre
(74) *Attorney, Agent, or Firm* — Drinker Biddle & Reath LLP (57) ABSTRACT

An image having good image quality is obtained by discharging charges accumulated in an image pickup device. A photographing apparatus, which includes an image pickup device having a plurality of pixels arranged in a matrix form and photographs a subject by light-exposing the image pickup device, includes: a detector for detecting a photographing state of the subject; an operation controller for controlling an operation of a curtain body traveling to block light to the image pickup device; and a scan controller for controlling a light-exposure start scan of the image pickup device by discharging charges accumulated in the image pickup device before the traveling of the curtain body, wherein the scan controller discharges the charges accumulated in the image pickup device a plurality of times according to the photographing state of the subject.

10 Claims, 8 Drawing Sheets

(56) References Cited

FOREIGN PATENT DOCUMENTS

| | | | |
|---|---|---|---|
| JP | 2001-212122 | A | 8/2001 |
| JP | 2006-197455 | A | 7/2006 |
| JP | 2007-053742 | A | 3/2007 |
| JP | 2007-159061 | A | 6/2007 |
| JP | 2008-017079 | A | 1/2008 |
| JP | 2008-271284 | A | 11/2008 |

OTHER PUBLICATIONS

Office Action established for JP 2009-290777 (Jul. 9, 2013).

* cited by examiner

PHOTOGRAPHING APPARATUS AND PHOTOGRAPHING METHOD

CROSS-REFERENCE TO RELATED PATENT APPLICATION

This application claims the benefit of Japanese Patent Application No. 2009-290777, filed on Dec. 22, 2009, in the Japanese Patent Office, and Korean Patent Application No. 10-2010-0119790, filed on Nov. 29, 2010, in the Korean Intellectual Property Office, the disclosure of which is incorporated herein in its entirety by reference.

BACKGROUND

The invention generally relates to a photographing apparatus and a photographing method, and in particular, to a photographing apparatus including an image pickup device having a plurality of pixels arranged in a matrix form and a photographing method thereof.

Japanese Patent Laid-Open Gazette No. H11-41523 discloses performing a front curtain of a shutter operation with an electronic shutter and performing a rear curtain of the shutter operation with a mechanical shutter in a photographing apparatus equipped with a Complementary Metal-Oxide Semiconductor (CMOS) type image pickup device.

In addition, Japanese Patent Laid-Open Gazette No. 2007-159061 ("the '061 patent") and Japanese Patent Laid-Open Gazette No. 2007-53742 ("the '742 patent") disclose the technology for preventing light-exposure stains from occurring due to a difference of a lens type, an iris value, or a shutter speed by changing a timing of starting charge accumulation in every area or line in a method of mixing an electronic shutter and a mechanical shutter.

The '061 and '742 patents aim at compensation for a conventional image quality problem generated by changing a mechanical front curtain to an electronic reset function. Thus, it is set that an operation timing of an electronic shutter for a front curtain has almost the same characteristics as an operation timing of a mechanical shutter for a rear curtain. In addition, for causes changing shutter characteristics, such as a lens type and an iris value, an operation timing is set by considering compensation parameters.

The electronic shutter performs a function as a front curtain of a shutter for starting light-exposure of an image pickup device by discharging charges accumulated in the image pickup device. A time required to fully discharge the charges accumulated in the image pickup device is commonly defined in a specification of each photographing apparatus by defining a valid pulse width of a charge discharging pulse. In a case of a number of lines in a vertical direction due to a number of pixels, it is necessary for a pulse width of the charge discharging pulse to be narrow in order to make a light-exposure start speed of the electronic shutter follow a traveling speed of the rear curtain of the mechanical shutter. However, if the pulse width of the charge discharging pulse becomes narrow, the charges accumulated in the image pickup device cannot be fully discharged, so remaining charges occur, thereby increasing an afterimage effect.

SUMMARY

Various embodiments of the invention provide a new and modified photographing apparatus for obtaining an image having good image quality by discharging charges accumulated in an image pickup device a plurality of times in a configuration of using both of an electronic shutter and a mechanical shutter, and a photographing method thereof.

According to an embodiment of the invention, there is provided a photographing apparatus, which includes an image pickup device having a plurality of pixels arranged in a matrix form and photographs a subject by light-exposing the image pickup device, the photographing apparatus including: a detector for detecting a photographing state of the subject; an operation controller for controlling an operation of a curtain body traveling to block light to the image pickup device; and a scan controller for controlling a light-exposure start scan of the image pickup device by discharging charges accumulated in the image pickup device before the traveling of the curtain body, wherein the scan controller discharges the charges accumulated in the image pickup device a plurality of times according to the photographing state of the subject.

According to this configuration, the curtain body may travel to block light to the image pickup device after starting the light-exposure of the image pickup device by detecting the photographing state of the subject and adjusting the number of times of discharging the charges accumulated in the image pickup device according to the detected photographing state. By doing this, an image having good image quality may be obtained by adjusting the number of times of discharging the charges accumulated in the image pickup device according to the photographing state.

The scan controller may operate the light-exposure start scan of the image pickup device as a front curtain of a shutter for starting the light-exposure of the image pickup device by discharging the charges accumulated in the image pickup device, and the operation controller may operate the curtain body for blocking light to the image pickup device as a rear curtain of the shutter. By doing this, an afterimage effect due to accumulation of unnecessary charges may be prevented by using both an electronic shutter as the front curtain and a mechanical shutter as the rear curtain and controlling the number of traveling times of the electronic shutter as the front curtain.

The scan controller may generate a discharging pulse for discharging the charges accumulated in the image pickup device to correspond to a traveling curve of the curtain body and generate the discharging pulse a plurality of times according to the photographing state of the subject. By doing this, an afterimage effect due to accumulation of unnecessary charges may be prevented by controlling a scan start speed of an electronic front curtain with the discharging pulse corresponding to the traveling curve and making the number of discharging times of the charges variable according to the photographing state.

The scan controller may generate the discharging pulse a plurality of times in a line unit of the image pickup device. By doing this, an afterimage effect due to accumulation of unnecessary charges may be prevented by generating the discharging pulse a plurality of times in a line unit.

The scan controller may discharge the charges accumulated in the image pickup device a plurality of times in a case of a photographing state in which an afterimage of the subject remains. The scan controller may discharge the charges accumulated in the image pickup device a plurality of times in a case where brightness of the subject is greater than a predetermined reference value. The scan controller may discharge the charges accumulated in the image pickup device a plurality of times in a case where a point light source of high brightness is included in the subject.

The scan controller may discharge the charges accumulated in the image pickup device a plurality of times in a case where a motion vector of the subject is equal to or greater than a predetermined threshold value. By doing this, an image having good image quality may be obtained by discharging the charges accumulated in the image pickup device a plurality of times in a case where brightness of the subject is high, a point light source of high brightness is included in the subject, or a motion vector of the subject is equal to or greater than the predetermined threshold value, or in a case of an photographing state in which an afterimage of the subject remains.

The detector may detect a hand shaking grade in the photographing state, and the scan controller may discharge the charges accumulated in the image pickup device a plurality of times in a case where the hand shaking grade detected by the detector is equal to or greater than a predetermined value. By doing this, an image having good image quality may be obtained by discharging the charges accumulated in the image pickup device a plurality of times in a case where possibility of an afterimage remaining due to hand shaking is high.

According to another embodiment of the invention, there is provided a photographing method of photographing a subject by light-exposing an image pickup device having a plurality of pixels arranged in a matrix form, the photographing method including: detecting a photographing state of the subject; starting light-exposure of the image pickup device by discharging charges accumulated in the image pickup device a plurality of times according to the photographing state of the subject; and operating a curtain body traveling to block light to the image pickup device after starting the light-exposure of the image pickup device.

Accordingly, an image having good image quality can be obtained by discharging charges accumulated in an image pickup device a plurality of times in a configuration of using both an electronic shutter and a mechanical shutter.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Various embodiments of the invention will now be described more fully with reference to the accompanying drawings, in which exemplary embodiments of the invention are shown. In the following specification and the accompanying drawings, for components substantially having the same functional configuration, duplicated description will be omitted by granting the same reference numeral to the components.

The best mode for embodying the invention is described in the following order below.

[1] Objectives of the embodiments
[2] Outline of a photographing apparatus
[3] Functional configuration of the photographing apparatus
[4] Details of an operation of the photographing apparatus 1. Objectives of the Embodiments The objectives of the embodiments will now be described. Performing a front curtain of a shutter operation with an electronic shutter and performing a rear curtain of the shutter operation with a mechanical shutter in a photographing apparatus equipped with a Complementary Metal Oxide Semiconductor (CMOS) type image pickup device is disclosed. In addition, technology for preventing light-exposure stains from occurring due to a difference of a lens type, an iris value, or a shutter speed by changing a timing of starting charge accumulation in every area or line in a method of mixing an electronic shutter and a mechanical shutter is also disclosed.

The technology compensates for a conventional image quality problem generated by changing a mechanical front curtain to an electronic reset function. Thus, it is set that an operation timing of an electronic shutter for a front curtain has almost the same characteristics as an operation timing of a mechanical shutter for a rear curtain. In addition, for causes changing shutter characteristics, such as a lens type and an iris value, an operation timing is set by considering compensation parameters.

The electronic shutter performs a function as a front curtain of a shutter for starting light-exposure of an image pickup device by discharging charges accumulated in the image pickup device. A time required to fully discharge the charges accumulated in the image pickup device is commonly defined in a specification of each photographing apparatus by defining a valid pulse width of a charge discharging pulse. In a case of a number of lines in a vertical direction due to a number of pixels, it is necessary for a pulse width of the charge discharging pulse to be narrow so that the light-exposure start speed of the electronic shutter is the same as a traveling speed of the rear curtain of the mechanical shutter. However, if the pulse width of the charge discharging pulse becomes narrow, the charges accumulated in the image pickup device cannot be fully discharged, so remaining charges occur, thereby increasing an afterimage effect.

Thus, a photographing apparatus 10 according to an exemplary embodiment deals with the above-described problem. By using the photographing apparatus 10, an image having good image quality can be obtained by discharging charges accumulated in an image pickup device a plurality of times in a configuration of using both an electronic shutter and a mechanical shutter.

2. Outline of a Photographing Apparatus

An outline of the photographing apparatus 10 according to an exemplary embodiment will now be described with reference to FIGS. 1 to 3. First, the occurrence of an afterimage will be described with reference to FIG. 1. An afterimage effect is an effect that a signal remains for several frames even after light of a subject disappears, i.e., an effect shown as if a moving subject has a tail as shown in an image example 302 of FIG. 1. This effect is caused by a small amount of charges remaining in an image pickup device being read after a next frame, since charges accumulated in the image pickup device when light-exposure of the image pickup device starts cannot be fully discharged.

As described, if the number of lines in a vertical direction increases due to an increase of the number of pixels, a light-exposure start speed of an electronic shutter cannot follow a rear curtain traveling speed of a mechanical shutter unless a pulse width of a charge discharging pulse is narrow. However, if the pulse width is narrow, the charges accumulated in the image pickup device cannot be fully discharged, so remaining charges occur, thereby causing an afterimage effect as shown in the image example 302 of FIG. 1.

Figure 1:
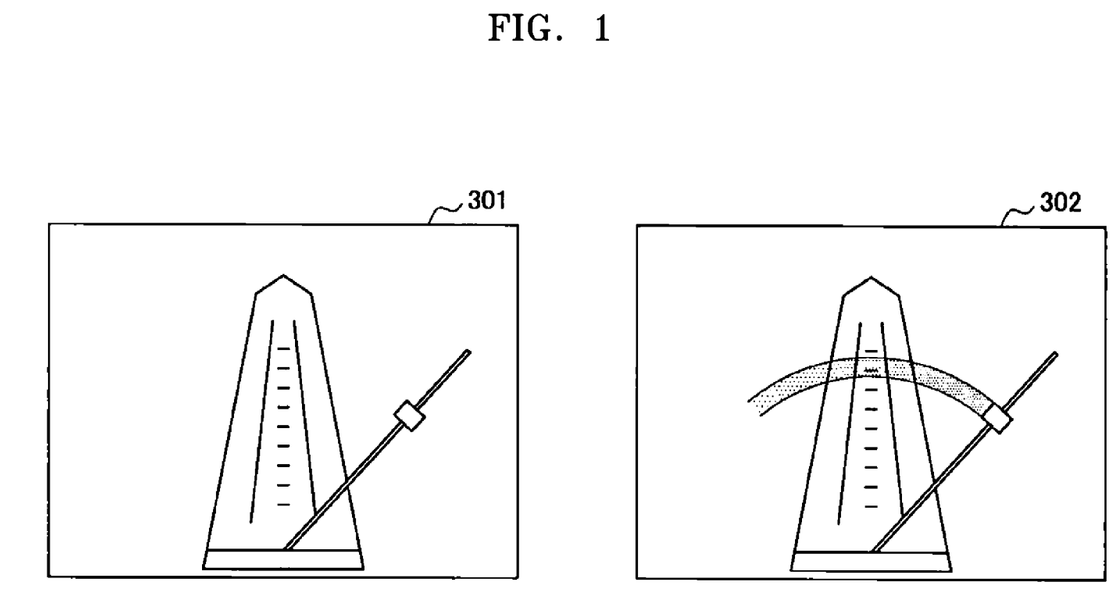
FIG. 1 is a pictorial diagram for describing the occurrence of an afterimage.

An image example 301 of FIG. 1 is an image having no afterimage since charges accumulated in an image pickup device are fully discharged. In order not to generate the afterimage effect shown in the image example 302 of FIG. 1, it is supposed that an entire pixel reset for discharging charges of the entire pixels at once is performed. For example, as shown in FIG. 2, the charges accumulated in the image pickup device are discharged by resetting the entire pixels before starting light-exposure of an electronic front curtain shutter. However, when a subject is commonly photographed using a photographing apparatus, such as a digital camera, the subject is photographed by pushing a shutter in a live-view mode. The live-view mode is a state that light illuminates an image pickup device while a shutter is opening.

Figure 2:
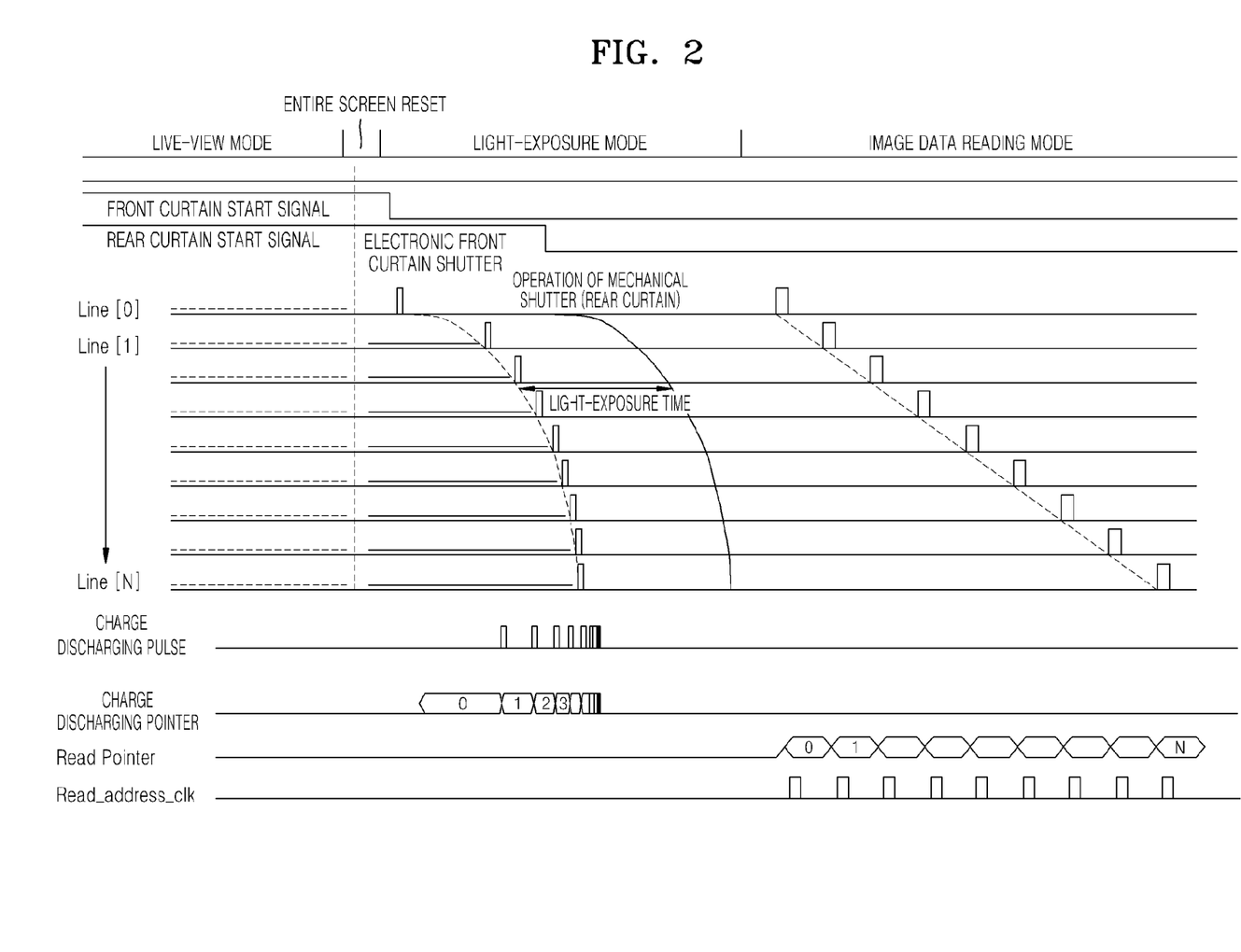
FIG. 2 is a timing diagram for describing an outline of a photographing apparatus according to an exemplary embodiment of the invention.

As shown in FIG. 2, if the entire pixel reset is performed in the live-view mode, a display screen of the image pickup device is very dark, or a time lag occurs from when the shutter is pushed to when the light-exposure starts. Thus, a still image cannot be consecutively captured in the live-view mode, thereby disturbing smooth photographing.

Thus, the photographing apparatus 10 according to an exemplary embodiment discharges charges accumulated in the image pickup device in the live-view mode by light-exposure start scans performed by operating the electronic front curtain shutter a plurality of times and sets a light-exposure start scan of the electronic front curtain shutter at the last time as an original light-exposure start. When the charges accumulated in the image pickup device are discharged by the entire pixel reset, a time for the entire pixel reset is required, and further, an amount of remaining charges in an upper screen is different from an amount of remaining charges in a lower screen, thereby generating image stains. However, when the electronic front curtain shutter is operated a plurality of times, an amount of remaining charges is almost the same in an upper screen and a lower screen, thereby reducing image stains.

Figure 3:
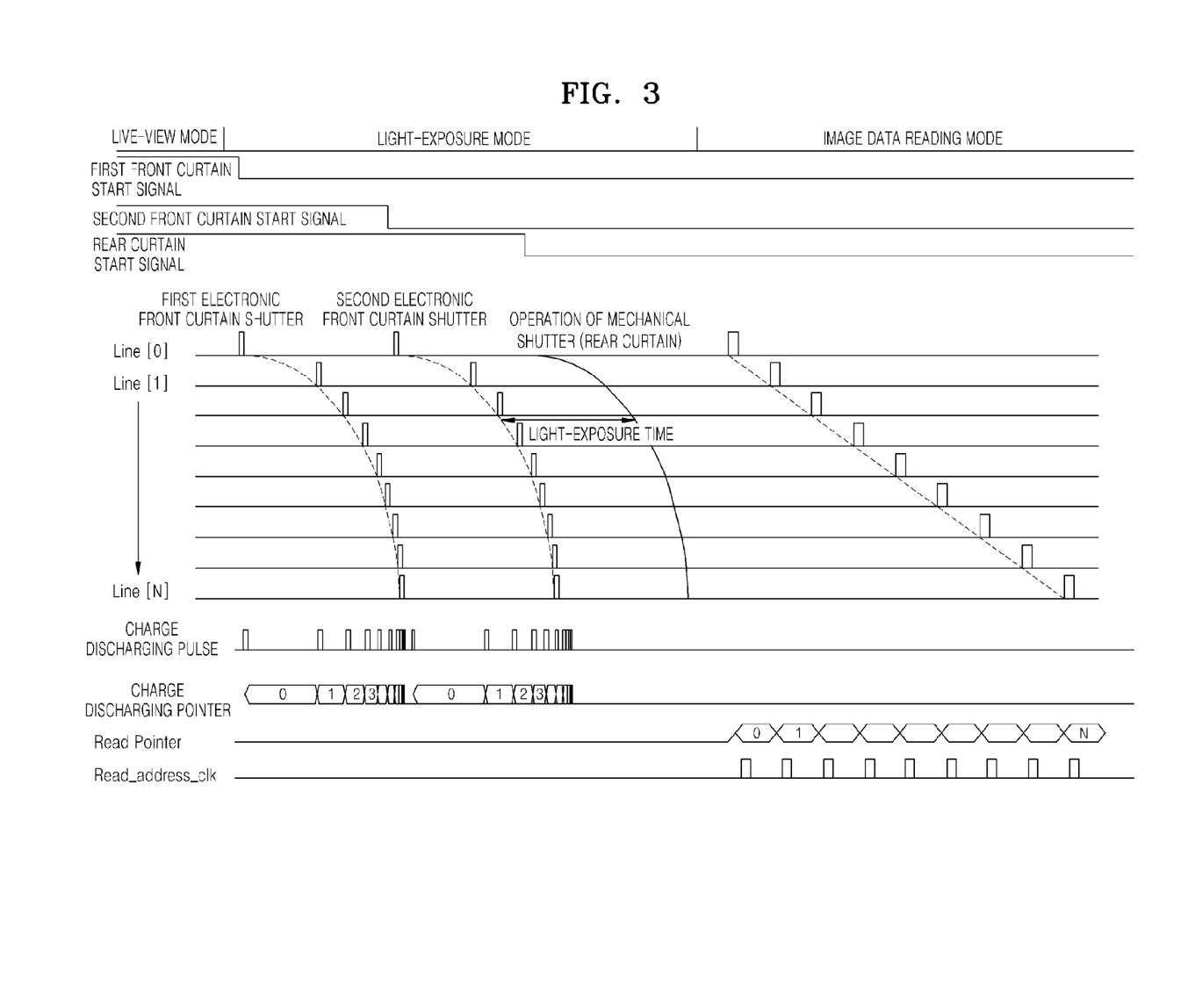
FIG. 3 is a timing diagram for describing an outline of a photographing apparatus according to another exemplary embodiment of the invention.

For example, the electronic front curtain shutter is operated two times in FIG. 3. As shown in FIG. 3, first and second light-exposure start scan traveling curves of the electronic front curtain shutter are the same as a traveling curve of a rear curtain of the mechanical shutter. By making the traveling curves of the electronic front curtain shutter be the same as the traveling curve of the mechanical shutter, an amount of remaining charges is the same in an upper screen and a lower screen, thereby obtaining an image with much less stains.

As shown in FIG. 3, a light-exposure start scan of the electronic front curtain shutter starts by generation of a charge discharging pulse. In detail, a line address is designated by discharging charges by a charge discharging pointer. When the charge discharging pulse goes 'H' (high), an image pickup device of a line designated by the charge discharging pointer is connected to the ground GND, thereby discharging charges accumulated in corresponding pixels. Hereinafter, the discharging of charges accumulated in an image pickup device means also that charges are reset.

As described above, photographing using the photographing apparatus 10 is used for still image photographing in the live-view mode. Thus, charges accumulated in the live-view mode are discharged while the charge discharging pulse is 'H'. In FIG. 3, after the charge discharging pulse is once generated by sequentially designating Line[0] to Line[N], the charge discharging pulse is secondly generated by sequentially designating Line[0] to Line[N] again.

The photographing apparatus 10 detects a photographing scene (photographing state) of a subject based on a light-measuring value per unit of area or line of a screen and outputs a charge discharging pulse stream as the electronic front curtain shutter a plurality of times according to the detected photographing scene.

When the detected photographing scene has a high possibility of afterimages, the photographing apparatus 10 outputs the charge discharging pulse stream a plurality of times. The photographing scene having a high possibility of afterimages is, for example, a case where a number of high brightness parts are included in a screen or a case where a point light source having high brightness is in a dark scene, such as a night view. In addition, a case where a vector amount of a motion vector in an image is greater than a predetermined value and the image has high brightness corresponds to the photographing scene having a high possibility of afterimages. Also, when hand shaking is detected, the charge discharging pulse stream may be output a plurality of times to reduce an influence of the hand shaking. As described above, when a scene having a high possibility of afterimages is captured, or when hand shaking is detected, charges accumulated in the image pickup device are discharged a plurality of times, thereby reducing image quality deterioration of an image due to afterimages.

3. Functional Configuration of a Photographing Apparatus

Figure 4:
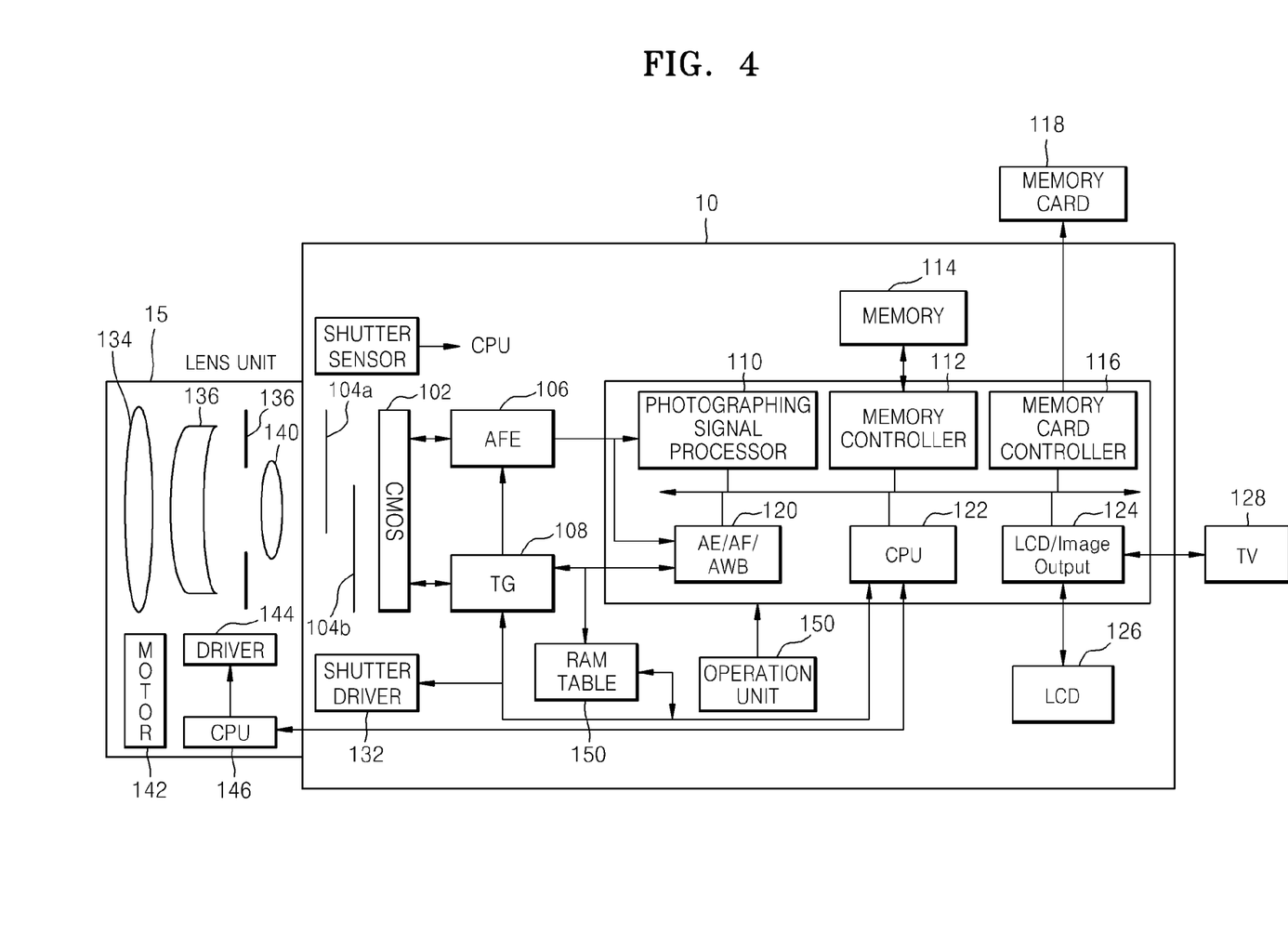
FIG. 4 is a block diagram of a photographing apparatus according to an exemplary embodiment of the invention.

The outline of the photographing apparatus 10 has been described. A functional configuration of the photographing apparatus 10 will now be described with reference to FIG. 4. FIG. 4 is a block diagram of the photographing apparatus 10 according to an exemplary embodiment. As shown in FIG. 4, the photographing apparatus 10 includes a CMOS image detector 102, shutters 104a and 104b (hereinafter, they are also called a shutter unit 104), an Analog Front End (AFE) 106, a Timing Generator (TG) 108, an photographing signal processor 110, a memory controller 112, a memory 114, a memory card controller 116, an Auto Exposure/Auto Focus/Auto White Balance (AE/AF/AWB) 120, a Central Processor Unit (CPU) 122, a Liquid Crystal Display/Image Output (LCD/IO) 124, an LCD 126, a Random Access Memory (RAM) table 130, a shutter driver 132, and a lens unit 15, and so forth.

The CMOS detector 102 is an example of an image pickup device having a plurality of pixels arranged in a matrix form according to an exemplary embodiment of the invention and converts light incident from the lens unit 15 to an electrical signal. In detail, the CMOS detector 102 outputs image signals of red (R), green (G), and blue (B) by converting a light image of a subject, which is image-formed by the lens unit 15, to analog, electrical signals (image signals) of color components of R, G, and B. In the current embodiment, a function as an electronic front curtain shutter is performed by starting a light-exposure operation of the CMOS detector 102 by applying a reset signal to each pixel of the CMOS detector 102 at a predetermined timing.

The shutter unit 104 includes a curtain body moving in a vertical direction of a predetermined pixel line and performs a function as a rear curtain for performing an operation of blocking light exposed to the CMOS detector 102. The operation of the shutter unit 104 is controlled by the shutter driver 132.

The AFE 106 is an analog front end circuit and provides the analog electrical signal output from the CMOS detector 102 to the photographing signal processor 110. The TG 108 has a function of inputting a timing signal to the CMOS detector 102 and the AFE 106. A shutter speed is determined by the timing signal output from the TG 108. That is, driving of the CMOS detector 102 is controlled by the timing signal output from the TG 108, and an electrical signal, which becomes the basis of image data, is generated by image light incident from a subject within a time of driving the CMOS detector 102.

The photographing signal processor 110 has a function of generating raw data of an image by converting the analog electrical signal output from the AFE 106 to a digital signal. The photographing signal processor 110 also compensates for a gain of light intensity and adjusts a white balance for the raw data of the image obtained from the CMOS detector 102. The memory controller 112 has a function of temporarily storing a picked-up image in the memory 114 or reading the stored image. The memory 114 has a storage capacity capable of storing a plurality of images. An example of the memory 114 is a Synchronous Dynamic Random Access Memory (SDRAM).

The memory card controller 116 has a function of storing a captured image or a composed image in a memory card 118. The memory card 118 is a card type storage device for storing data in a flash memory.

The AE/AF/AWB 120 has a function of detecting surrounding light intensity (brightness), a focal distance, an iris value (focus), and a color temperature in photographing and providing a detection result to the CPU 122. The CPU 122 performs a signal system command for the CMOS detector 102 or the TG 108 or performs an operation system command for an operation unit 150. In the current embodiment, the signal system command and the operation system command are performed by one CPU 122. However, the invention is not limited thereto, and the signal system command and the operation system command may be performed by two CPUs, respectively. A front curtain control by an electronic shutter and a rear curtain control by a mechanical shutter, which are performed by the CPU 122, will be described in detail later.

The LCD 126 has a function of displaying a live-view before photographing or displaying various setup screens or a picked-up image. A Television (TV) 128 has a function of displaying a picked-up image on a screen thereof. The display of image data on the LCD 126 or the TV 128 is performed by the LCD/IO 124.

The RAM table 130 stores a scan table according to an exemplary embodiment of the invention. The RAM table 130 may store a plurality of scan patterns in advance to select a scan pattern according to a photographing scene. Alternatively, the RAM table 130 may store a reference scan pattern to change the reference scan pattern according to a difference between a value of surrounding light intensity or another value of a photographing scene and a reference value. A scan pattern is a timing of outputting a reset timing (light-exposure start timing) by an electronic front curtain shutter. In the current embodiment, a scan curve of a reset scan of an electronic front curtain shutter has almost the same form as a traveling curve of a mechanical rear curtain shutter.

The RAM table 130 may also store the number of discharging times of charges according to a photographing scene, such as brightness of a picked-up image. The RAM table 130 may also store the number of discharging times of charges according to a hand shaking grade. For example, discharging of charges by the electronic shutter may be performed a plurality of times when a brightness value is greater than a predetermined value or when a hand shaking grade is greater than a predetermined value.

A function generation circuit (not shown), instead of the RAM table 130 for storing a scan pattern, may be provided in the photographing apparatus 10. In this case, for a function, a method of simply representing with a second-order function or a method of interpolating with a first-order function may be used. A circuit equipped in the photographing apparatus 10 may be small by outputting a scan timing by the function generation circuit.

The operation unit 150 includes members for operating the photographing apparatus 10 or performing various settings in photographing. The members of the operation unit 150 may include a power button, a cross key, and a selection button for selecting a photographing mode or a photographing drive mode and setting effect parameters, and a shutter button for starting an operation of photographing a subject.

Figure 5:
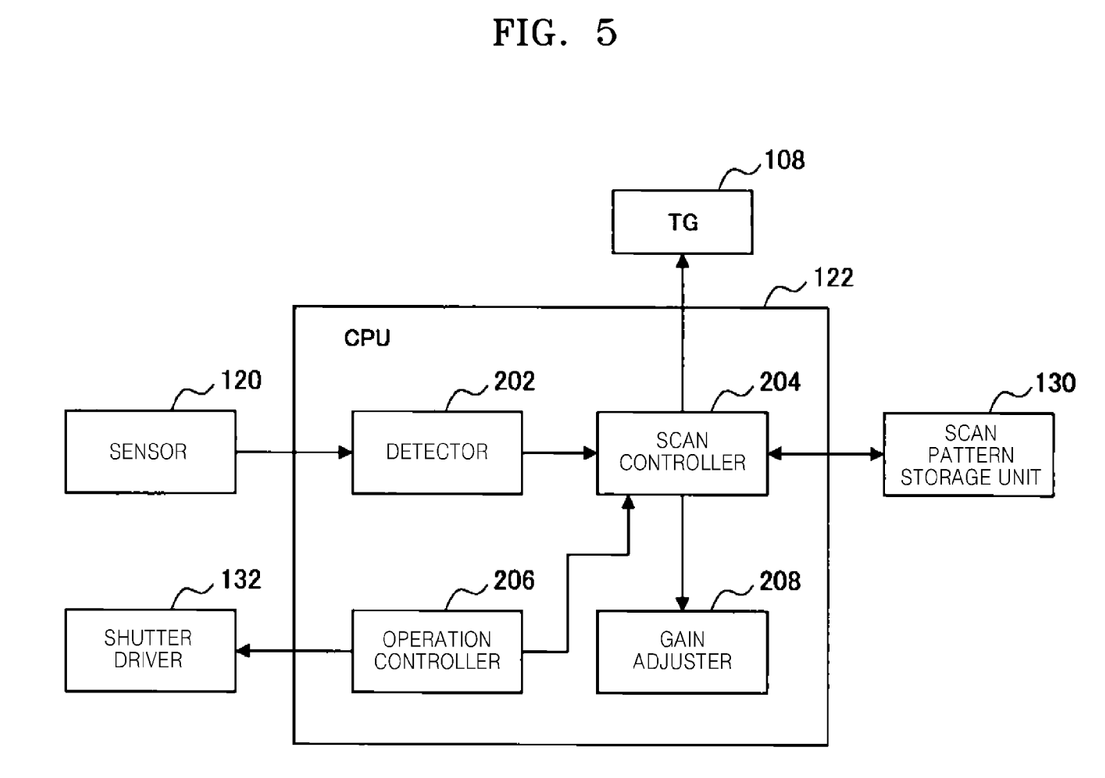
FIG. 5 is a block diagram of a central processor unit (CPU) according to an exemplary embodiment of the invention.

The control of the front curtain and the rear curtain by the CPU 122 will now be described with reference to FIG. 5. FIG. 5 is a block diagram of the CPU 122 according to an exemplary embodiment. As shown in FIG. 5, the CPU 122 includes a detector 202, a scan controller 204, an operation controller 206, and a gain adjuster 208.

The detector 202 has a function of detecting a photographing state of a subject. In detail, the detector 202 detects whether a photographing scene (photographing state) is within a proper dynamic range when the photographing scene is reproduced as an image, by detecting the photographing state (photographing scene) from surrounding light intensity (brightness), a focal distance, an iris value, and a color temperature detected by various sensors, such as the AE/AF/AWB 120. For example, the detector 202 detects whether an image, which cannot be reproduced according to white blurring due to overexposure or black transition due to underexposure, exists.

Figure 6:
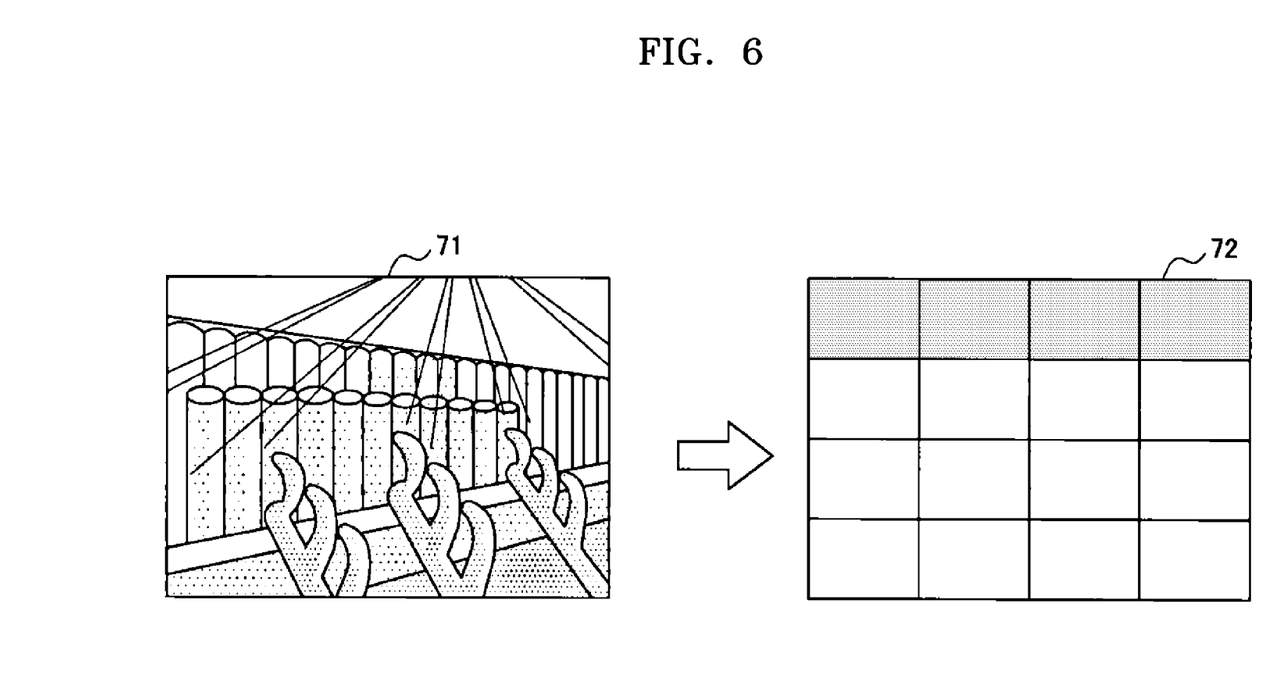
FIG. 6 is a pictorial diagram for describing detection of a photographing scene according to an exemplary embodiment of the invention.
Figure 7:
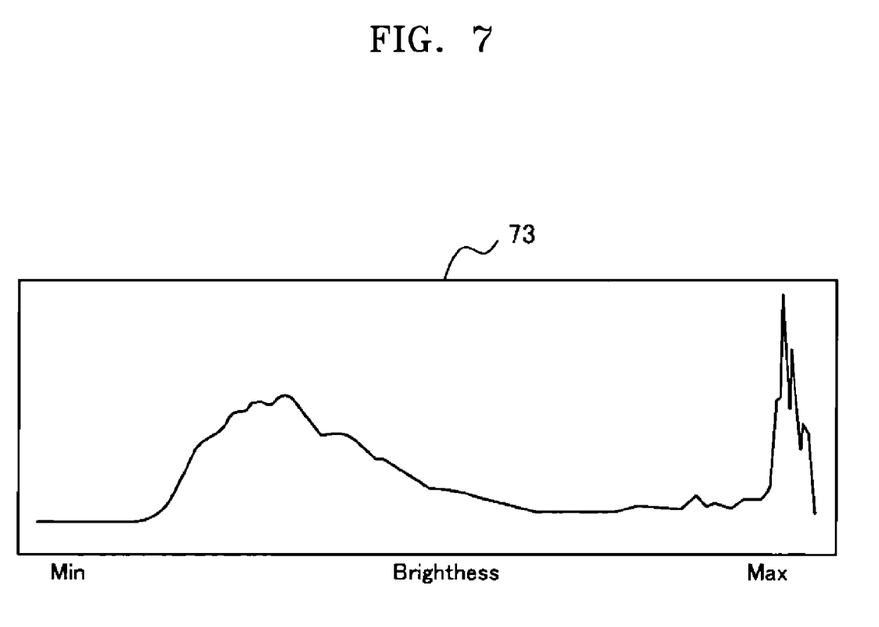
FIG. 7 is a graph for describing detection of a photographing scene according to another exemplary embodiment of the invention.

Detection of a photographing scene by the detector 202 will now be described with reference to FIGS. 6 and 7. FIGS. 6 and 7 illustrate detection of a photographing scene by the detector 202. FIG. 6 illustrates an image in which a blue sky cannot be reproduced since an upper part of the image is blurred due to white blurring. The detector 202 detects an area in which white blurring occurs in a screen 71. For example, a white blurring area may be detected by dividing the screen 71 into predetermined regions as shown in a description drawing 72. In this case, 4 regions in an upper part of the screen 71 are detected as a white blurring area, i.e., an area exceeding the upper limit of the dynamic range.

A white blurring area in a screen may be detected by a histogram 73 shown in FIG. 7. The histogram 73 shows a high peak on the right. That is, an area in which white blurring occurs particularly exists can be identified on a portion of the screen. If a white blurring area is wide in the screen, i.e., if a high brightness portion is large in the screen, since charges accumulated in an image pickup device are not fully discharged, there is a high possibility of an afterimage effect. If there is a high possibility of an afterimage effect, the photographing apparatus 10 adjusts the number of light-exposure scan times of the image pickup device through the scan controller 204, thereby obtaining an image having good image quality.

The detector 202 may detect a hand shaking grade when a user pushes the shutter button of the photographing apparatus 10. For example, when a gyro sensor is equipped in the photographing apparatus 10, the detector 202 detects a hand shaking grade by using an angular velocity sensed by the gyro sensor.

Referring back to FIG. 5, a configuration of the CPU 122 is as follows. Light-exposure of the CMOS detector 102 starts by discharging charges accumulated in the CMOS detector 102 before traveling of the curtain body due to the operation controller 206 to be described later. The scan controller 204 adjusts the number of discharging times to discharge charges accumulated in the image pickup device according to a photographing state of a subject detected by the detector 202. The scan controller 204 discharges the charges accumulated in the CMOS detector 102 based on a scan pattern stored in the scan pattern storage unit (RAM table 130).

When the scan pattern storage unit (the RAM table 130) stores the number of charge discharging times corresponding to a brightness value or a hand shaking grade, the scan controller 204 outputs a charge discharging pulse stream a plurality of times based on the corresponding number of charge discharging times.

As shown in FIG. 3, the light-exposure start scan of the electronic front curtain shutter starts by the generation of a charge discharging pulse. In detail, a line address for discharging charges is designated by the charge discharging pointer. When the charge discharging pulse goes 'H' (high), an image pickup device of a line designated by the charge discharging pointer is connected to the ground GND, thereby discharging charges accumulated in corresponding pixels.

For example, when the scan controller 204 discharges charges accumulated in an image pickup device two times, the scan controller 204 outputs a first front curtain start signal and a second front curtain start signal before a rear curtain start signal of the mechanical shutter. If the first front curtain start signal is output, line addresses Line[0] to Line[N] are designated, and a pulse stream of a first charge discharging pulse is output. Thereafter, a second front curtain start signal is output, and a pulse stream of a second charge discharging pulse is output. As shown in FIG. 3, the pulse streams of the first and second charge discharging pulses are sequentially output on a line basis to be the same scan pattern as that of the mechanical shutter.

Referring back to FIG. 5, the operation controller 206 has a function of controlling an operation of the curtain body traveling to block light to the CMOS detector 102. The operation controller 206 controls an operation of the curtain body through the shutter driver 132. The operation controller 206 performs mechanical light blocking by traveling the curtain body after an elapse of a set light-exposure time after the light-exposure operation of the CMOS detector 102 starts by a control of the scan controller 204, thereby ending the light-exposure operation of the CMOS detector 102.

As described above, when the electronic front curtain shutter is operated a plurality times by the scan controller 204, the operation controller 206 travels the curtain body after a final operation for main light-exposure of the electronic front curtain shutter is performed. As described above, the scan controller 204 performs the light-exposure start scan as a front curtain of a shutter for starting light-exposure of the CMOS detector 102 by granting a reset signal to each pixel based on a scan pattern.

The operation controller 206 operates the curtain body for blocking light to the CMOS detector 102 as a rear curtain of the shutter. The scan controller 204 outputs a pulse of a reset signal a plurality of times according to a photographing scene or hand shaking. As described above, the scan controller 204 adjusts the number of output times of a reset signal according to a photographing scene or hand shaking, and the operation controller 206 controls the mechanical rear curtain shutter, thereby reducing image quality deterioration of an image due to afterimages.

The gain adjuster 208 has a function of adjusting a gain per predetermined area by being synchronized with reading of pixels in a horizontal direction of the CMOS detector 102 by the scan controller 204 when an operation of reading each pixel of the CMOS detector 102 is controlled by the scan controller 204. The gain adjuster 208 adjusts a gain in a pixel unit of the CMOS detector 102 and adjusts a gain based on a predetermined function indicating a gain change width by being synchronized with a reading position of pixels in the horizontal direction of the CMOS detector 102.

For example, when a plurality of reading circuits on an area or pixel basis are equipped in the CMOS detector 102 in the horizontal direction, each reading circuit including a gain adjustment amplifier, the gain adjuster 208 adjusts a gain of a corresponding gain adjustment amplifier for a corresponding area. A gain of a gain adjustment circuit included in the AFE 106 may be changed by being synchronized with reading of pixels in the horizontal direction.

In this case, the gain adjustment circuit for adjusting a gain in the horizontal direction may be included in the AFE 106, the photographing signal processor 110, or the TG 108. The gain adjuster 208 may change a gain of the gain adjustment circuit included in the photographing signal processor 110 by being synchronized with reading of pixels in the horizontal direction. In this case, a circuit for providing a gain variation due to a position in the horizontal direction is included in the photographing signal processor 110.

Although a gain is adjusted by the gain adjuster 208 on a predetermined area or pixel basis in the current embodiment, the invention is not limited thereto, and a gamma curve may be changed on an area basis. The gamma curve is a characteristic curve indicating a ratio of a signal level of an input image to brightness of an output image. The CPU 122 may adjust exposure of a screen by adjusting the gamma curve.

4. Details of an Operation of a Photographing Apparatus

Figure 8:
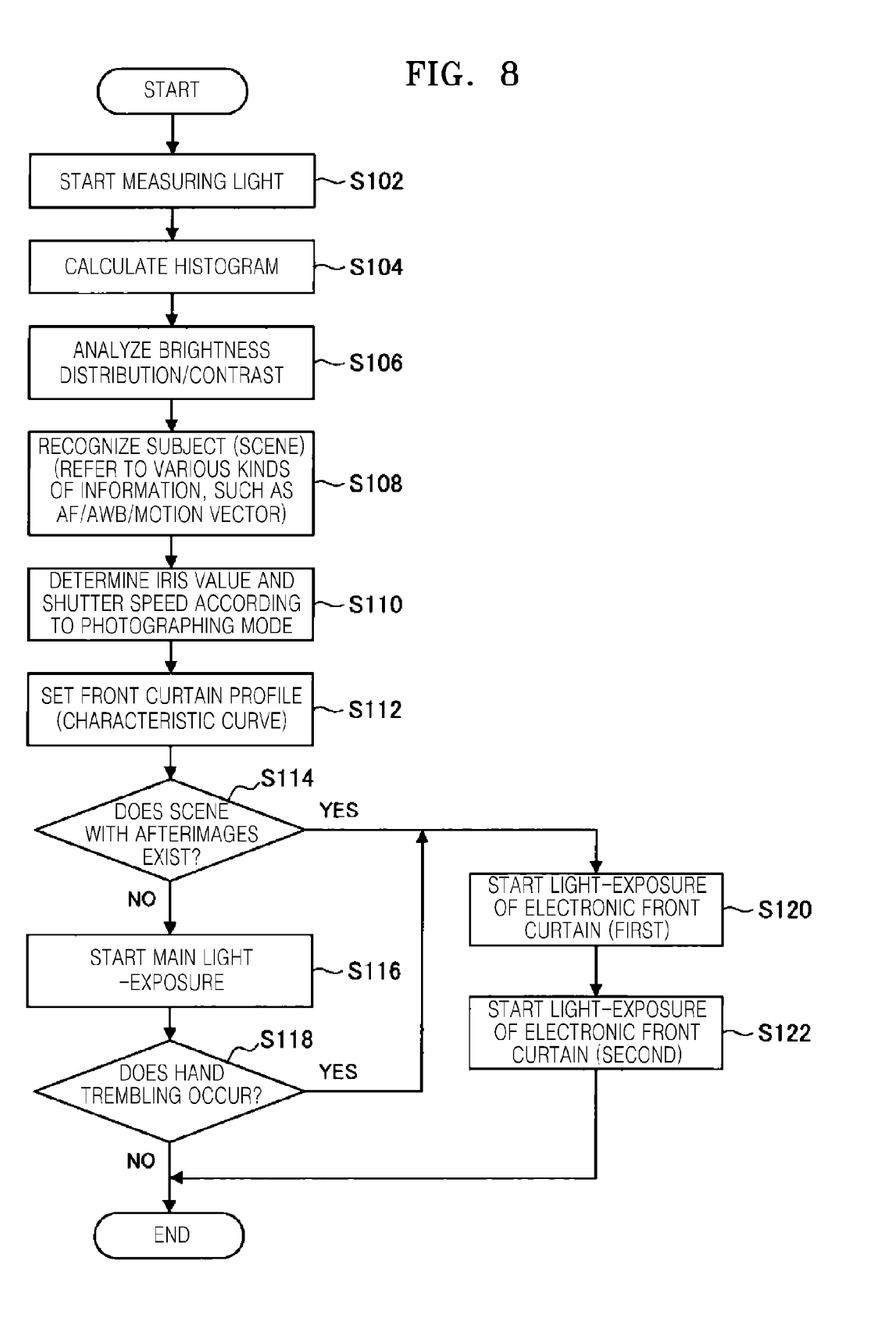
FIG. 8 is a flowchart of a detailed operation of the photographing apparatus, according to an exemplary embodiment of the invention.

The functional configuration of the photographing apparatus 10 has been described. An operation of the photographing apparatus 10 will now be described in detail with reference to FIG. 8. FIG. 8 is a flowchart of a detailed operation of the photographing apparatus 10, according to an exemplary embodiment. As shown in FIG. 8, the detector 202 starts measuring light in a screen, in operation S102.

In operation S104, a histogram is calculated based on light-measuring data acquired in operation S102. The histogram calculated in operation S104 is, for example, the graph shown in FIG. 7. In operation S106, a brightness distribution or contrast is analyzed from the histogram calculated in operation S104.

In operation S108, a photographing state of a subject (scene) is recognized based on the analysis of the brightness distribution or contrast in a screen performed in operation S106. In operation S108, AE information and AF/AWB information may be used, or information regarding a motion vector may be used.

In operation S110, an iris value and a shutter speed are determined according to a set mode. In operation S112, a profile (characteristic curve) of an electronic front curtain is set based on the iris value and the shutter speed determined in operation S110, a scan pattern of the mechanical rear curtain shutter, and so forth.

In operation S114, it is determined based on a brightness value and so forth detected in operations S106 to S110 whether the photographing scene is a scene with afterimages. The scene with afterimages in operation S114 is, for example, a case where a high brightness part in the screen exceeds a reference value, a case where a point light source having high brightness is in a dark scene, or a case where a motion vector amount exceeds a reference value.

The case where a high brightness part in the screen exceeds a reference value is, for example, a case where a white blurring part is large. The case where a point light source having high brightness is in a dark scene is, for example, a case of photographing a night view. The motion vector amount is a value obtained by detecting a speed of a moving subject compared with an image of a previous frame, and when a quickly moving subject is photographing, a vector amount exceeds the reference value. In this case, it is determined that the photographing scene has a high possibility of afterimages.

If it is determined in operation S114 that the photographing scene is not a scene with afterimages, main light-exposure starts as usual in operation S116. That is, the electronic front curtain is operated only once. Otherwise, if it is determined in operation S114 that the photographing scene is a scene with afterimages, the electronic front curtain is operated a plurality of times. In FIG. 8, the electronic front curtain is operated two times. First light-exposure of the electronic front curtain starts in operation S120, and thereafter, second light-exposure of the electronic front curtain starts in operation S122.

The light-exposure start in operations S120 and S122 is performed by discharging charges accumulated in an image pickup device by sequentially generating a charge discharging pulse per line of the image pickup device. As shown in FIG. 3, the charge discharging pulse of the image pickup device is output at a time at which the characteristics are the same as those of rear curtain of the mechanical shutter.

Referring back to FIG. 8, it is determined in operation S118 whether hand shaking occurs after starting the main light-exposure in operation S116. The occurrence of hand shaking in operation S118 is a case where an output of the gyro sensor is greater than a predetermined reference value. If it is determined in operation S118 that hand shaking occurs, the process proceeds to operations S120 and S122. Otherwise, if it is determined in operation S118 that hand shaking does not occur, the process ends.

Whether hand shaking occurs in operation S118 is determined when the shutter of the photographing apparatus 10 is pushed. Thus, in operation S114, the number of discharging times of charges is adjusted according to brightness of a screen or a motion of a subject. Even if it is determined in operation S114 that it is unnecessary to scan the electronic front curtain a plurality of times, when hand shaking is detected in operation S116, the electronic front curtain is scanned a plurality of times.

As described above, an afterimage effect occurring due to brightness of a screen, a motion of a subject, or hand shaking can be prevented, thereby obtaining an image having good image quality.

An operation of the photographing apparatus 10 has been described in detail. According to the photographing apparatus 10, a photographing state of a subject is detected, light-exposure of an image pickup device starts by adjusting the number of discharging times of charges accumulated in the image pickup device according to the photographing state, and the curtain body travels to block light to the image pickup device. By doing this, when a subject that easily makes an afterimage effect is photographing, the afterimage effect can be reduced by scanning the electronic front curtain shutter a plurality of times.

While the invention has been particularly shown and described with reference to exemplary embodiments thereof, it will be understood by those of ordinary skill in the art that various changes in form and details may be made therein without departing from the spirit and scope of the invention as defined by the following claims.

Although the electronic front curtain is scanned a plurality of times according to brightness of a screen or a motion of a subject to reduce an afterimage effect, the invention is not limited thereto. For example, when photographing with afterimages is performed on purpose, the number of scan times of the electronic front curtain may be adjusted so that an afterimage remains.

As another example, the operations of the photographing apparatus 10 in the specification do not have to be processed in a time series according to the order disclosed in the flowchart. That is, the operations of the photographing apparatus 10 may be performed in parallel.

In addition, a computer readable program that performs the same function of hardware, such as a CPU, a ROM, and a RAM, equipped in the photographing apparatus 10 as the configuration of the photographing apparatus 10 may be edited. In addition, a non-transitory storage medium for storing therein the computer readable program is provided.

The functions described above may be implemented within software modules and comprise software algorithms. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media is readable by the computer, stored in the memory, and executed by the processor.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components that perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

What is claimed is:

1. A photographing apparatus, comprising:
    an image pickup device having a plurality of pixels arranged in a matrix form and that photographs a subject by light-exposing the image pickup device;
    a detector for detecting a photographing state of the subject;
    an operation controller for controlling an operation of a curtain body traveling to block light to the image pickup device;
    a scan pattern storage unit storing a number of charge discharging times corresponding to a brightness value or a hand shaking grade; and
    a scan controller for controlling a light-exposure start scan of the image pickup device by discharging charges accumulated in the image pickup device before the traveling of the curtain body,
    wherein in still image photographing the scan controller discharges the charges accumulated in the image pickup device a plurality of times when the photographing state of the subject having a high possibility of afterimages is captured or when hand shaking is detected, based on the corresponding number of charge discharging times stored in the scan pattern storage unit.

2. The photographing apparatus of claim 1, wherein:
    the scan controller operates the light-exposure start scan of the image pickup device as a front curtain of a shutter for starting the light-exposure of the image pickup device by discharging the charges accumulated in the image pickup device, and
    the operation controller operates the curtain body for blocking light to the image pickup device as a rear curtain of the shutter.

3. The photographing apparatus of claim 1, wherein the scan controller generates a discharging pulse for discharging the charges accumulated in the image pickup device to correspond to a traveling curve of the curtain body and generates the discharging pulse a plurality of times according to the photographing state of the subject.

4. The photographing apparatus of claim 3, wherein the scan controller generates the discharging pulse a plurality of times in a line unit of the image pickup device.

5. The photographing apparatus of claim 1, wherein the scan controller discharges the charges accumulated in the image pickup device a plurality of times when a photographing state in which an afterimage of the subject remains.

6. The photographing apparatus of claim 1, wherein the scan controller discharges the charges accumulated in the image pickup device a plurality of times when a brightness of the subject is greater than a predetermined reference value.

7. The photographing apparatus of claim 1, wherein the scan controller discharges the charges accumulated in the image pickup device a plurality of times when a point light source of high brightness is included in the subject.

8. The photographing apparatus of claim 1, wherein the scan controller discharges the charges accumulated in the image pickup device a plurality of times when a motion vector of the subject is equal to or greater than a predetermined threshold value.

9. The photographing apparatus of claim 1, wherein:
    the detector detects a hand shaking grade in the image pickup state, and
    the scan controller discharges the charges accumulated in the image pickup device a plurality of times when the hand shaking grade detected by the detector is equal to or greater than a predetermined value.

10. A photographing method of still-image photographing a subject by light-exposing an image pickup device having a plurality of pixels arranged in a matrix form, the photographing method comprising:
    detecting a photographing state of the subject;
    starting still-image photographing light-exposure of the image pickup device by discharging charges accumulated in the image pickup device a plurality of times when the photographing state of the subject having a high possibility of afterimages is captured or when hand shaking is detected, based on a corresponding number of charge discharging times stored in a scan pattern storage unit; and
    operating a curtain body traveling to block light to the image pickup device after starting the light-exposure of the image pickup device.

* * * * *